(12) United States Patent
Nakamichi

(10) Patent No.: US 6,895,711 B1
(45) Date of Patent: May 24, 2005

(54) SOFT BAIT SECURED IN PLACE ON A FISHING HOOK

(75) Inventor: Shigeyuki Nakamichi, Nishiwaki (JP)

(73) Assignee: Owner America Corp., Costa Mesa, CA (US)

( * ) Notice: Subject to any disclaimer, the term of this patent is extended or adjusted under 35 U.S.C. 154(b) by 11 days.

(21) Appl. No.: 10/762,780

(22) Filed: Jan. 23, 2004

(51) Int. Cl.$^7$ ............................................. A01K 85/00
(52) U.S. Cl. ................................................ 43/42.53
(58) Field of Search ......................... 43/42.53, 42.37, 43/42.24, 42.26

(56) References Cited

U.S. PATENT DOCUMENTS

| | | | | |
|---|---|---|---|---|
| 2,572,608 A | * | 10/1951 | Gabor | 43/42.24 |
| 3,158,952 A | * | 12/1964 | Creme | 43/42.24 |
| 3,165,858 A | * | 1/1965 | Rutter | 43/42.53 |
| 3,349,513 A | * | 10/1967 | Jeff | 43/42.02 |
| 3,483,650 A | * | 12/1969 | Weaver | 43/35 |
| 3,724,116 A | * | 4/1973 | Lindner et al. | 43/42.24 |
| 3,748,773 A | * | 7/1973 | Goforth | 43/42.1 |
| 3,802,115 A | * | 4/1974 | Auten et al. | 43/42.31 |
| 3,940,669 A | * | 2/1976 | Tsuboi et al. | 318/721 |
| 3,978,606 A | * | 9/1976 | Riggs | 43/42.24 |
| 4,214,397 A | * | 7/1980 | Kent | 43/42.28 |
| 4,653,212 A | * | 3/1987 | Pixton | 43/4.5 |
| 4,744,168 A | * | 5/1988 | McClellan | 43/42.24 |
| 4,926,578 A | * | 5/1990 | Morse et al. | 43/42.24 |
| 5,379,544 A | * | 1/1995 | Davidson | 43/42.24 |
| 5,386,658 A | * | 2/1995 | Ferguson et al. | 43/42.25 |
| 5,446,991 A | * | 9/1995 | Brackus | 43/42.37 |
| 6,138,399 A | * | 10/2000 | Wilson | 43/42.24 |
| 6,226,918 B1 | * | 5/2001 | Rigney | 43/42.24 |

* cited by examiner

*Primary Examiner*—Teri Pham Luu
*Assistant Examiner*—Jordan Lofdahl
(74) *Attorney, Agent, or Firm*—David T. Bracken

(57) ABSTRACT

The present invention is a method for securing a soft bait on a fishing hook. The method includes using one or more stay pieces slidable along a hook shaft to prevent undesired movement of the soft bait on the hook shaft.

11 Claims, 4 Drawing Sheets

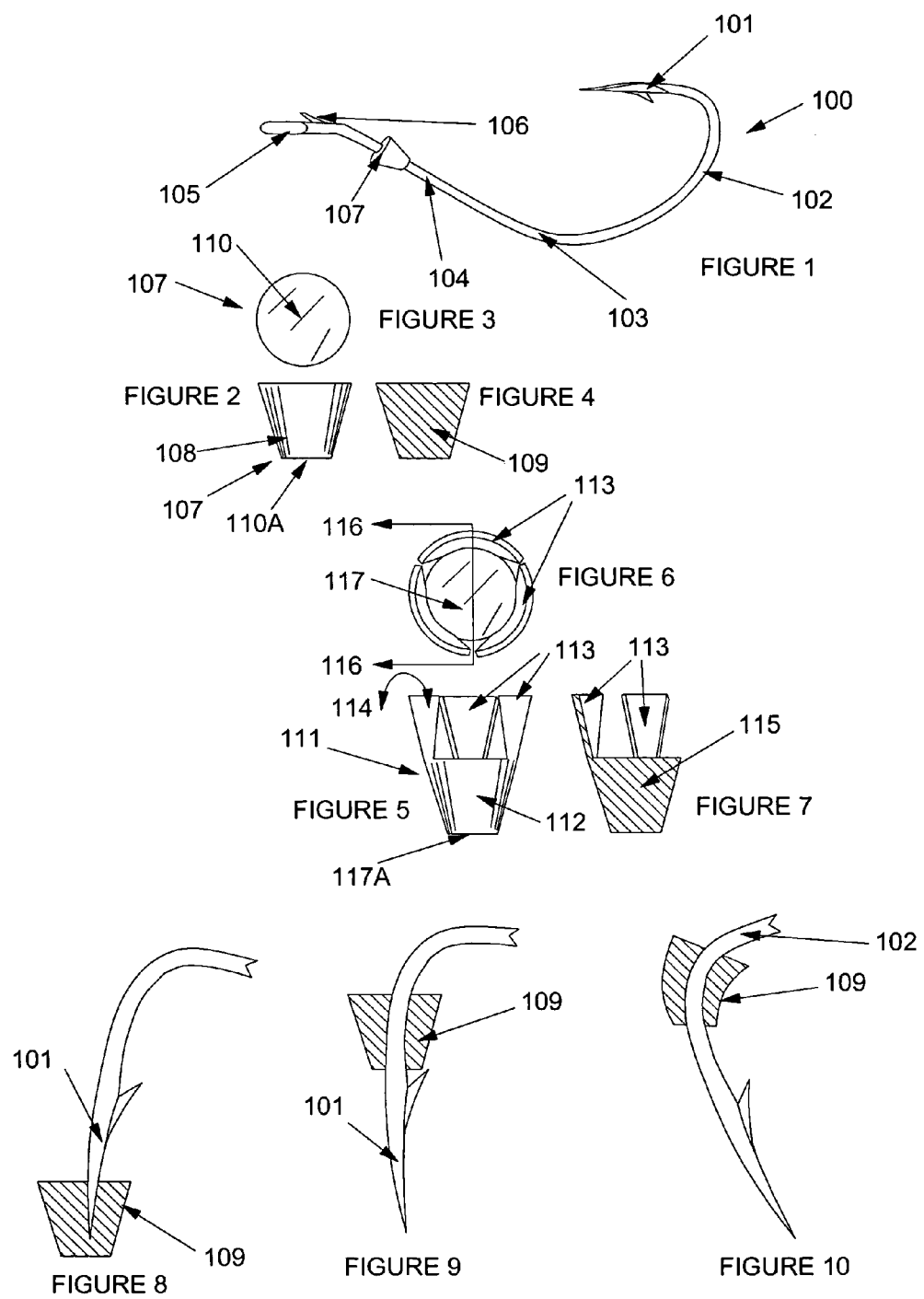

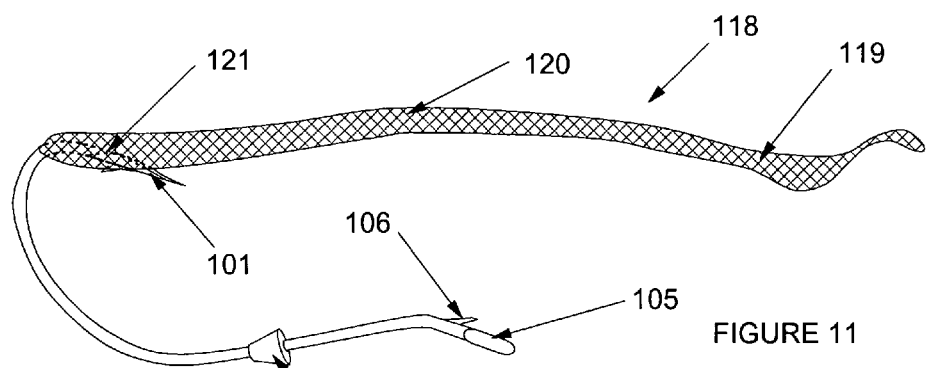
FIGURE 11
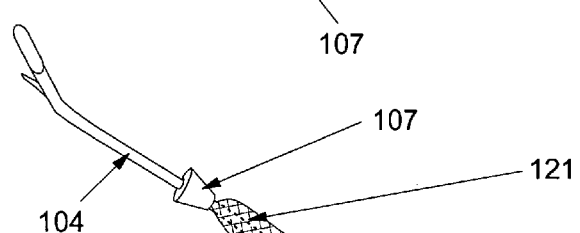
FIGURE 12
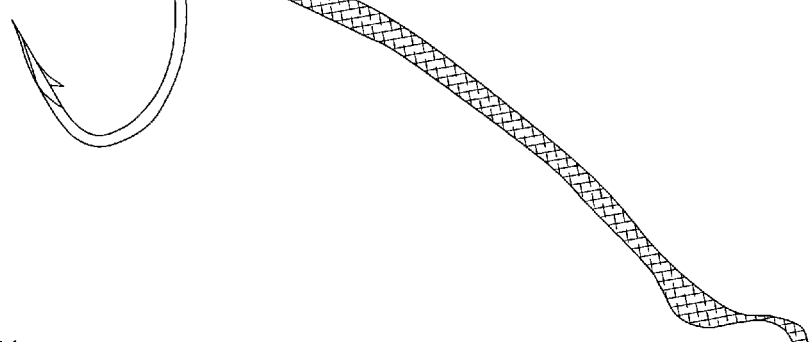
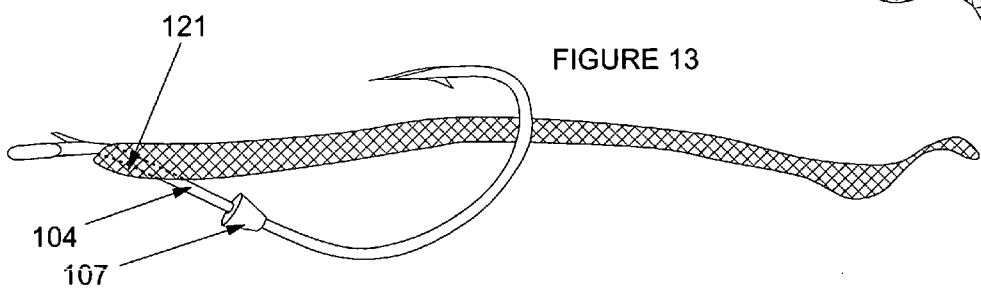
FIGURE 13

SOFT BAIT SECURED IN PLACE ON A FISHING HOOK

BACKGROUND OF THE INVENTION

The present invention relates to features of a fishing hook, more particularly structures for maintaining a position of a soft bait on a fishing hook.

The prior art describes that a soft plastic or elastomeric shape may be used as a lure when securely attached to a fishing hook. These soft plastic or elastomeric shapes have come to be known as "soft baits", partly because they may be compressed, stretched, and even broken in two with the force supplied by a user's hands. Soft baits are often colored and made into shapes similar to live baits used by fishermen. A popular and highly effective soft bait is one formed like a relatively long worm such as a night crawler. Other well known shapes of soft baits include a crawfish, insects, salamanders, small to mid size fish, as well as shapes that have no known analog to a live bait. It has been speculated that soft baits do not act like their live bait analogs when being drawn through the water to attract game fish. However, soft baits as they are drawn through the water do in fact attract game fish very well, even when many other baits and lures do not work at all.

Soft baits usually consist of a single soft and elastomeric material or polymer. The soft and pliable nature of soft baits make them easy to lose in typical fishing situations. Carolina and Texas "riggin" or rigging are forms of setting a fishing hook in a soft bait. Generally, the object of these forms of rigging is to connect the soft bait to specific locations on the hook to maximize security (the tendency to stay connected to a hook) and obstacle shielding (avoiding hooking underwater weeds and branches). It is well known to introduce a fishing hook point in a soft bait and draw the hook through the soft bait until a part of the soft bait is located covering or near the hook's fishing line connector. Another part of the soft bait is simultaneously or later drawn onto the hook point to shield it from underwater weeds or branches.

The above forms of rigging are effective for attracting fish and avoiding underwater obstructions to some degree. However, the simple act of dragging of the soft bait underwater for trolling often pulls the soft bait from its forward position covering or near the hook's fishing line connection. This act in turn pushes the soft bait covering the hook point from its shielding position. The hook point shielding is lost and the intended trolling form is drastically changed so that the entire hook and soft bait wobble instead of moving smoothly through the water. There is a need for a structure to improve the security of soft baits on fishing hooks.

Fish that are likely to be drawn to soft baits often gather in areas of underwater plants, weeds and branches. These fish seek protection from other predator fish and waterfowl. While soft baits are effective, their use can be limited where a user suspects that they will lose their soft bait by water drag or contact with underwater weeds or branches. Prior art devices have not effectively supported soft baits on relatively slender fishing hooks from these underwater hazards.

SUMMARY OF THE INVENTION

The present invention is one or more barbs and/or one or more movable stay pieces on a fishing hook to prevent a soft bait from moving from its desired setting. In a simplest embodiment, an elastomeric or polymeric stay piece is movable along a shaft of a fishing hook and is secured adjacent to an outside surface of a soft bait. The stay piece has a broad surface abutting the soft bait so that the soft bait cannot easily move past that broad surface and down the hook shaft where the stay piece is located.

In a preferred embodiment of a method for using the stay piece, a part of a soft bait is threaded onto a fishing hook in the manner of Texas or Carolina rigging. In that style of rigging, a part of the soft bait covers or is near the hook's fishing line connection. A stay piece is moved on hook's shaft from a distal position to the hook's fishing line connection to a more proximal position abutting an outside surface of the soft bait.

In a more preferred embodiment, the stay piece comprises a threadable end and an abutting end, where the hook's shaft passes in one of the ends and out the other. The threadable end comprises a relatively small surface area radial from an axis of the hook's shaft. The abutting end comprises a relatively large surface area radial from an axis of the hook's shaft. The stay piece formed in this way is threaded onto the hook's shaft so that the threadable end is pointed toward the hook's point and the abutting end is pointed toward the hook's fishing line connection. The stay piece is threaded onto the hook's shaft before drawing a soft bait onto the hook. The stay piece is located relatively far from the hook's fishing line connection. The soft bait is drawn onto the hook in the manner of Texas or Carolina rigging. In that style of rigging, a part of the soft bait covers or is near the hook's fishing line connection. However, in the invention method, a leading surface of the soft bait drawn onto the hook's point is drawn up the hook's shaft until it reaches the threadable end of the stay piece. This leading surface of the soft bait is soft enough so that a user can use finger pressure to push the soft bait into the threadable surface, causing the stay piece to be enveloped by the soft bait. The user continues to push the soft bait up the hook's shaft while the stay piece remains in place on the hook's shaft. As the user continues to push the soft bait up the hook's shaft and over the stay piece, the stay piece emerges from the soft bait. The soft bait is then positioned over or near the hook's fishing line connection. The stay piece is then moved up the hook's shaft so that the abutting end abuts an outside surface of the soft bait.

In the previous method, the abutting end of the stay piece prevents the soft bait from being pushed back down the hook's shaft. The stay piece prevents the soft bait from being pushed out its desired position by the drag of water or contact with underwater weeds or branches. Referring to use of the invention combination of soft bait, hook and stay piece, the combination can be drawn by fishing line through water to be affected by water drag and contact with solid objects. However, the stay piece (and/or one or more barbs on the hook) will resist substantially prevent the soft bait from being moved down the hook's shaft. The stay piece, as described above, has an abutting end that presses against an outside surface of a soft bait when the combination is in underwater forward motion. The abutting end may be flat, concave or comprise flexible extensions adapted to pass through soft bait.

Each stay piece comprises an effective radial diameter. This effective radial diameter is measured from a central axis of the stay piece. The central axis is approximately where the hook's shaft is located when the stay piece is threaded onto that shaft. The radial diameter of each stay piece is relatively small. This effective radial diameter is small enough so that when the stay piece is drawn through the soft bait, the passing of the stay piece will not substantially affect the soft bait structure. If an effective radial diameter is too large, the act of its passing through the soft bait will so enlarge an internal path that the soft bait will be easily drawn over the abutting end of the stay piece in use. The abutting end is adapted to retain the soft bait in place but also to have a small enough effective radial diameter so that the soft bait is not damaged by the stay piece's passage through the soft bait.

The present invention also includes threading stay pieces into other places on a fishing hook shaft to maintain the location of a soft bait on a hook's shaft. Where practical, stay pieces can be set on one or both sides of a soft bait regardless of the location of the soft bait on a hook's shaft.

In one embodiment, a stay piece can be set so that its abutting end is adjacent to a part of a soft bait covering a point of a fishing hook. The stay piece keeps underwater weeds and branches from substantially pushing the soft bait from a shielding position when being drawn through the water. However, a fish strike will deliver enough force to drive the soft bait past the abutting end and expose the hook's point to set the fish on the hook.

In another embodiment, two stay pieces are set on a hook's shaft adjacent to a threaded-on part of a soft bait. The part of a soft bait is bracketed by the abutting ends of stay pieces. In this position, the threaded-on part of the soft bait cannot move in either direction on the hook's shaft.

Many of the most supple and desirable of soft baits are easily cut or smashed. If soft baits are sufficiently cut or smashed, such soft baits cannot be secured in place or held at all on a fishing hook. The present invention uses stay pieces to dramatically improve the security and shielding function of soft baits on fishing hooks. However, no structure can entirely prevent loss of a soft bait from a fishing hook. If a structure can entirely prevent such a loss, the material being used on the fishing hook is not a soft bait.

BRIEF DESCRIPTION OF THE DRAWINGS

FIG. 1 is a side view of an invention hook with a stay barb and stay piece.

FIGS. 2, 3 and 4 are respectively side, abutting end, and cross section views of a first type of stay piece.

FIGS. 5, 6 and 7 are respectively side, abutting end, and cross section views of a second type of stay piece.

FIGS. 8, 9 and 10 respectively show first, second and third threading-on steps for a cross section view of a stay piece onto a hook's shaft.

FIGS. 11, 12 and 13 respectively show first, second and third threading-on steps for threading a soft bait onto a fishing hook's point and upward on the hook's shaft past a stay piece on the hook's shaft.

DETAILED DESCRIPTION OF THE INVENTION

Figure 14:
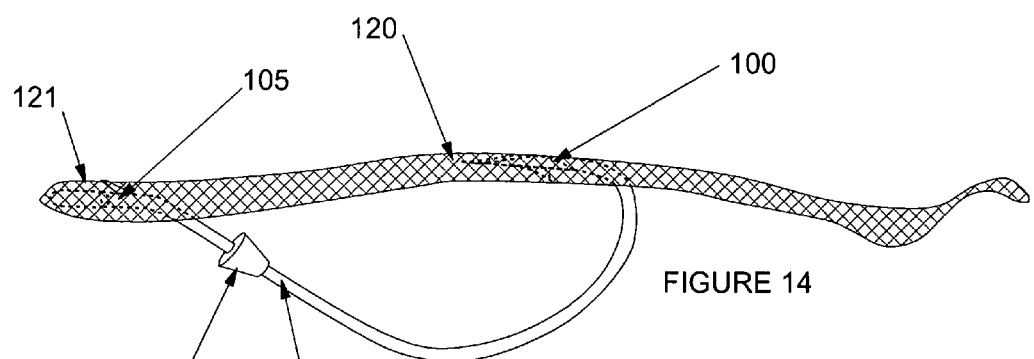
FIGS. 14 and 15 show side views of the stay piece of FIG. 13 moved adjacent to a part of the soft bait on the hook's shaft in FIG. 13.

The invention is now discussed with reference to the figures.

FIG. 1 shows a fishing hook 100 comprises a barbed end 101 continuing to shaft sections 102, 103 and 104, ending in section 105 that comprises a fishing line connection. The fishing line connection can be a simple closed loop of hook 100 metal.

Sections 104 and/or 105 optionally comprise one or stay barbs as generally shown for stay barb 106. Stay barbs are continuous with and are formed from the shaft material of section 104 or 105. Stay barbs are adapted to retain a soft bait drawn over them and left embedded therein. Barbs 106 are not entirely effective in retaining a soft bait on sections 104 and/or 105 during trolling or other fishing operation. The invention stay pieces are used alone or in addition to the stay barbs in the invention.

Stay piece 107 is shown in FIG. 1 threaded up to section 104. Stay pieces according to the invention may have flat abutting ends 110 (as in FIG. 3), may comprise extensions 113 from abutting end 117 (as in FIGS. 5, 6 and 7), or may be concave. The abutting ends of the invention stay pieces are adapted to resist passage of a soft bait over the stay piece if the abutting end is facing opposite the direction of motion of the soft bait.

FIGS. 2, 3 and 4 show a stay piece 107 with a generally frustro conical shape. A sloped surface 108 extends from a threadable end 110A to abutting end 110. As more completely described above, the greatest effective radial diameter of stay piece 107 is that of abutting end 107. Cross section 109 shows that stay piece 107 comprises a solid elastomer or polymer piece that may be pierced by a point of a fishing hook at either of ends 110 or 110A and moved up a hook's shaft sections. When in position on a hook's shaft, substantial force is required to move a stay piece from that position due to compression of the hook's shaft by the solid body part of a stay piece.

FIGS. 5, 6 and 7 show an alternate stay piece 111 having an abutting end 117, a threadable end 117A, an outside surface 112, and solid body part 115 in FIG. 7 as the cross section 116 of FIG. 6. Stay piece 111 comprises extensions 113 from abutting end 117. Extensions 113 are adapted to fold outward in direction 114 when impressed against an outside surface of a soft bait. Such extensions 113 give additional resistance to a soft bait being pushed against abutting end 117 and over the solid body part of stay piece 111.

FIG. 8 shows the solid body 109 of a stay piece pierced by a fishing hook point in section 101. FIG. 9 shows that the shaft of section 101 runs through the body 109. FIG. 10 shows that body 109 can flex so that it can be moved along curved portions of a fishing hook.

FIG. 11 shows a soft bait 119 comprising tail section 119, mid section 120 and head section 121, where the point in section 101 of hook 100 has pierce and been threaded through head section 121. FIG. 12 shows that after the step of FIG. 11, section 121 is threaded up to hook shaft section 103 and encounters the threadable end of stay piece 107. In the operation of moving from the representations of FIGS. 12 and 13, a user presses section 121 of the soft bait against the threadable end of stay piece 107 until the soft bait is pierced by the threadable end. The user then continues pushing the pierced part of soft bait section 121 over stay piece 107 until it clears the abutting end of stay piece 107, as shown in FIG. 13.

Figure 15:
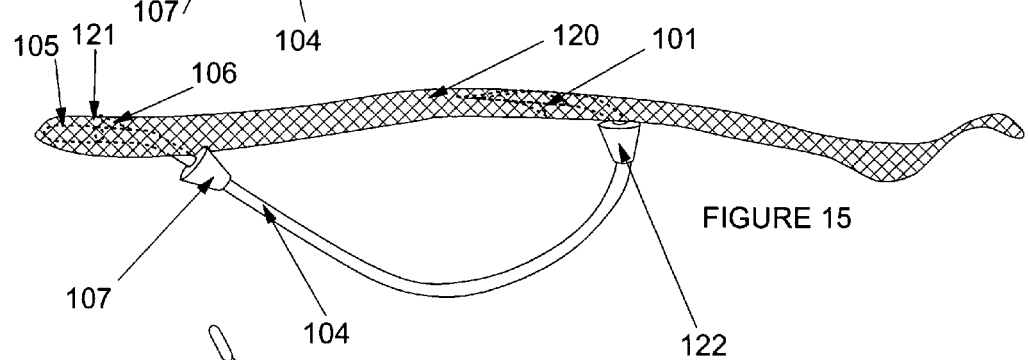

FIG. 14 shows that the pierced part of section 121 has been moved up to hook shaft section 105 so that barb 106 is embedded in section 121. In addition, section 120 has been pierced by the hook point and threaded onto hook shaft section 101 so that the point and barb of the hook are protected by section 120. FIG. 15 shows that the abutting end of stay piece 107 has been moved up to hook shaft section 104 and presses against an outside surface of soft bait section 121.

FIG. 15 shows an alternate embodiment of the invention stay pieces. Stay piece 122 is threaded onto shaft section 102 before the step of pressing soft bait section 120 onto hook shaft section 101. When soft bait section 120 is pressed onto hook shaft section 101, an abutting end of stay piece 122 is moved back up the hook's shaft to hook shaft section 101. Stay piece is moved close to or adjacent to an outside surface of soft bait section 120 so that section 120 cannot easily pass down hook shaft section 101 to section 102 and leave the hook's point unprotected.

Figure 16:
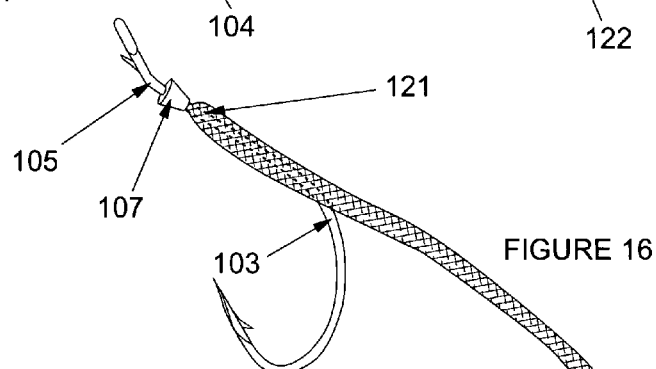
FIGS. 16 and 17 show side views of respectively setting a stay piece close to a hook's fishing line connection and subsequently leaving the stay piece embedded in a soft bait drawn over the stay piece.
Figure 17:
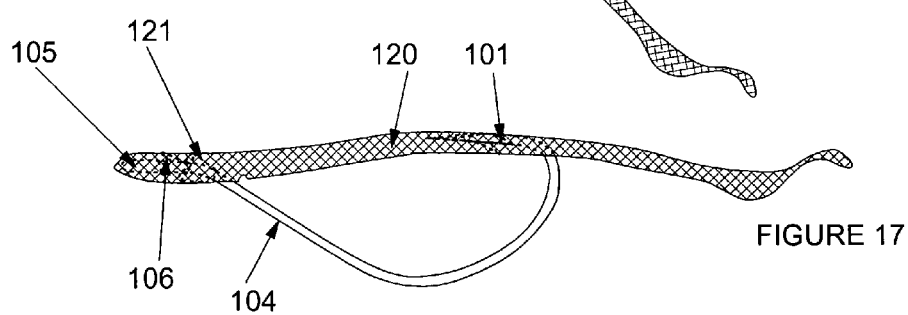

FIG. 16 shows the first step in embedding a stay piece 107 within a portion of a soft bait. FIG. 17 shows where stay piece 107 is located during use of the combination. FIG. 16 shows that stay piece 107 has been moved to hook shaft section 105 near barb 106 and that soft bait section is adjacent to the threadable end of stay piece 107. FIG. 17 shows that after the step of FIG. 16 the soft bait section 121 has been moved to embed barb 106 and stay piece 107.

Figure 18:
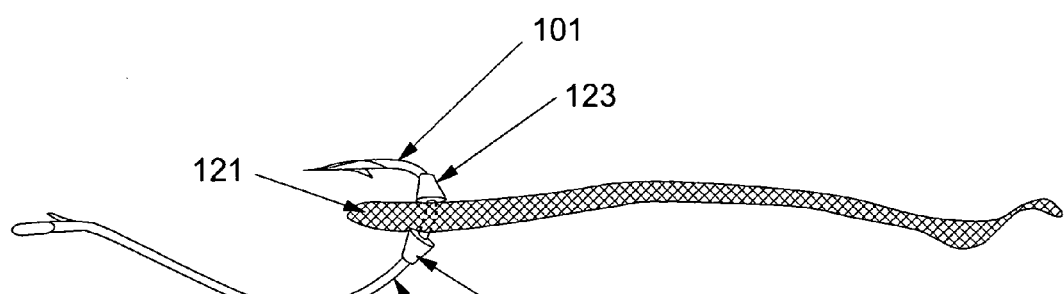
FIGS. 18 and 19 respectively show two stay pieces holding in place on a hook's shaft an end and middle part of a soft bait.
Figure 19:
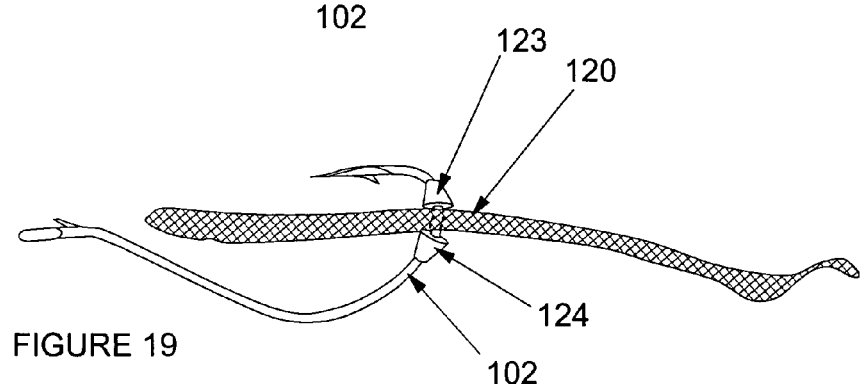

FIGS. 18 and 19 show hooks that have two stay pieces with their abutting ends bracketing a soft bait on a hook shaft. FIGS. 18 and 19 show that stay pieces 123 and 124 prevent, respectively, soft bait sections 121 and 120 from moving along hook shaft section 102.

It is preferred that the frustro conical solid bodies of stay pieces have small, threadable end diameters of 0.5 to 5 millimeters and large, abutting end diameters of from 2 to 10 millimeters. In this embodiment, the effective radial diameter is from 2 to 5 millimeters. The choice of end diameters for frustro conical solid bodies will depend on the diameter or hook shafts and qualities of the elastomer or polymer of the soft bait according to the objects of the invention.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A method of forming a fishing lure combination comprising:
   (a) a fishing hook comprising
      (i) a first section having a barbed point continuing to a first hook shaft;
      (ii) a second section having a curved hook shaft extending from the first hook shaft; and
      (iii) a third section having a fishing line connection at the end of a third hook shaft extending from the curved second hook shaft,
   (b) connecting a fishing line to the fishing line connection, where the fishing line extends to a fishing reel and the fishing hook is adapted to be drawn through a body of water by the fishing line so that the barbed point is pointed substantially in the direction of the fishing line near the fishing line connection;
   (c) one or more stay pieces consisting of elastomer or polymer substantially firmer than of a soft bait and formed into a frustro conical solid body with a central axis, a small, threadable end and a larger abutting end
   (d) inserting the barbed point into the abutting end along the central axis of a first stay piece and threading the first stay piece from the first hook shaft to the second hook shaft, where the first stay piece is substantially secured in place in the second section by compression of the second hook shaft;
   (e) the soft bait having a head section, a mid section and a tail section, the soft bait comprising substantially elastomer or pliable polymer substantially softer than the stay pieces, applying the soft bait to the hook comprising:
      (i) piercing the head section with the barbed point and threading the soft bait onto the hook so that the barbed point emerges before reaching the mid section;
      (ii) threading the pierced head section along the first and second sections to encounter the threadable end of the first stay piece; and
      (iii) pushing the head section against the threadable end until the soft bait is pierced by and passes free the first stay piece to be located at the third section; and
   (f) moving the first stay piece adjacent to an outside surface of the head section so that the abutting end prevents the head section from moving toward the second section.

2. The method of claim 1 wherein a radial diameter of the threadable end measured normal to the central axis ranges from 0.5 to 5 millimeters and the soft bait is not substantially damaged by drawing the first stay piece through the soft bait.

3. The method of claim 2 wherein a radial diameter of the abutting end measured normal to the central axis ranges from 2 to 10 millimeters and the soft bait is not substantially damaged by drawing the first stay piece through the soft bait.

4. The method of claim 1 wherein a part of the mid section or tail section is pierced sufficiently by the barbed point so that the soft bait protects the barbed point from snagging on underwater obstructions.

5. The method of claim 1 wherein a second stay piece is pierced by inserting the barbed point into a second threadable end and threading the second stay piece onto the first hook shaft or the second hook shaft at least a short distance from the barbed point, where the second stay piece is substantially secured in place by compression of the first or second hook shaft.

6. The method of claim 5 wherein a part of the mid section or tail section is pierced sufficiently by the barbed point so that the soft bait protects the barbed point from snagging on underwater obstructions and the second stay piece is moved such that its abutting end is adjacent to an outside surface of the soft bait in the mid section or tail section enclosing the barbed point.

7. The method of claim 1 wherein the third section comprises one or more stay barbs pointed substantially in the direction of the fishing line connection and the stay barbs are embedded in the head section.

8. The method of claim 7 wherein the fishing hook, stay piece and soft bait are drawn through a body of water and the head section cannot move downward from its position on the third hook shaft because of opposition thereto by the first stay piece and the stay barbs.

9. A method of forming a fishing lure combination comprising:
   (a) a fishing hook comprising
      (i) a first section having a barbed point continuing to first hook shaft;
      (ii) a second section having a curved hook shaft extending from the first hook shaft; and (iii) a third section having a fishing line connection at the end of a third hook shaft extending from the curved second hook shaft, (b) connecting a fishing line to the fishing line connection, where the fishing line extends to a fishing reel and the fishing hook is adapted to be drawn through a body of water by the fishing line so that the barbed point is pointed substantially in the direction of the fishing line near the fishing line connection;

(c) first and second stay pieces consisting of elastomer or polymer substantially firmer than of a soft bait and formed into a frustro conical solid body with a central axis, a small, threadable end and a larger abutting end;

(d) inserting the barbed point into a threadable end of the first stay piece and threading the first stay piece from the first hook shaft to the second hook shaft, where the first stay piece is substantially secured in place in the second section by compression of the second hook shaft;

(e) inserting the barbed point into an abutting end of the second stay piece and threading the second stay piece a distance the first stay;

(f) the soft bait having a head section, a mid section and a tail section, the soft bait comprising substantially all elastomer or pliable polymer substantially softer than the stay pieces, the steps of applying the soft bait to the hook comprising:

(i) piercing the head or mid section with the barbed point and threading the soft bait onto the hook so that the barbed point emerges before reaching the head or mid section;

(ii) threading the pierced head section along the hook shaft to encounter the threadable end of the second stay piece; and (iii) pushing the head or mid section against the threadable end of the second stay piece until the soft bait is pierced by and passes free of the second stay piece; and (g) moving the first stay piece adjacent to an outside surface of the soft bait so that the abutting end contacts the soft bait.

10. The method of claim 9 wherein a radial diameter of the threadable end measured normal to the central axis ranges from 0.5 to 5 millimeters and the soft bait is not substantially damaged by drawing the first stay piece through the soft bait.

11. The method of claim 10 wherein a radial diameter of the abutting end measured normal to the central axis ranges from 2 to 10 millimeters and the soft bait is not substantially damaged by drawing the first stay piece through the soft bait.

* * * * *